United States Patent [19]
Kommers et al.

[11] 3,797,743
[45] Mar. 19, 1974

[54] UTILITY SPRAYER UNIT

[75] Inventors: William J. Kommers, Sioux City, Iowa; Clarence E. Stewart, South Sioux City, Nebr.

[73] Assignee: The Broyhill Co., Dakota City, Nebr.

[22] Filed: July 26, 1973

[21] Appl. No.: 382,674

[52] U.S. Cl. ............... 239/148, 239/149, 239/172, 280/5 R, 222/176
[51] Int. Cl. ............................................ B05b 9/02
[58] Field of Search .......... 239/140, 141, 146, 172, 239/149, 148; 280/5 R, 5 H; 222/160, 165, 176, 180

[56] References Cited
UNITED STATES PATENTS

| 974,628 | 11/1910 | Barnes | 239/148 |
|---|---|---|---|
| 2,518,771 | 8/1950 | Gol | 239/172 X |
| 3,265,308 | 8/1966 | Hopkins | 239/172 |

FOREIGN PATENTS OR APPLICATIONS

| 22,212 | 2/1936 | Australia | 239/148 |
|---|---|---|---|
| 159,036 | 9/1954 | Australia | 239/172 |
| 709,759 | 6/1954 | Great Britain | 239/146 |

Primary Examiner—Robert S. Ward, Jr.
Attorney, Agent, or Firm—Morton S. Adler

[57] ABSTRACT

A corrosion resistant molded polyethylene tank for lawn and garden sprayable solutions is mounted to a manually propelled wheeled cart by a corrosion free attachment arrangement. Opposed sides of the tank are provided with relatively deep angled grooves or tracks engageable with and slidable on opposed, rearwardly extending and upwardly inclined frame components on the cart so that the tank can only be mounted from the rear of the cart with proper registration therewith assured. A removable stop between the frame components at the rear of the tank prevents tank displacement from the cart. A power spray mechanism is mounted to a support cover on the tank or, in a second embodiment, to a separate engine mount carried by the frame and seated against the stop.

12 Claims, 9 Drawing Figures

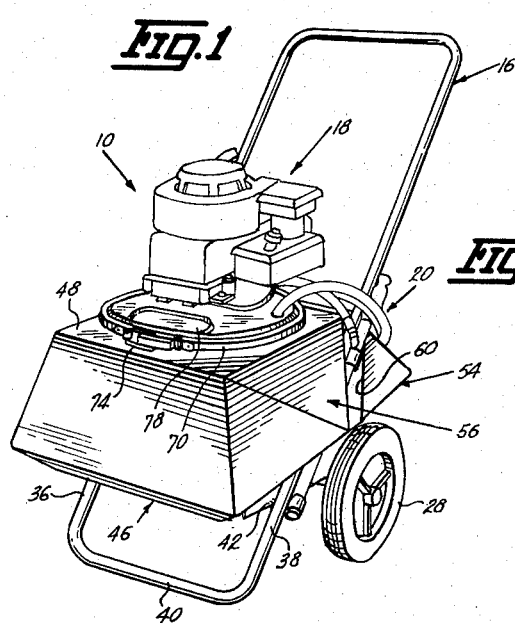

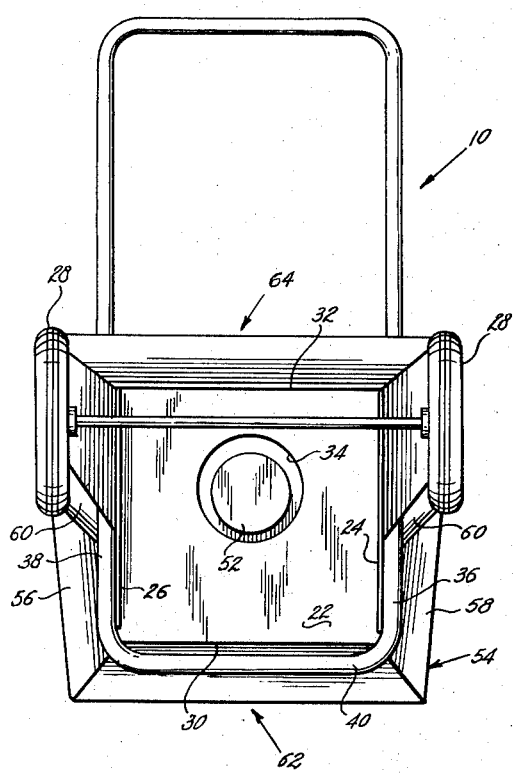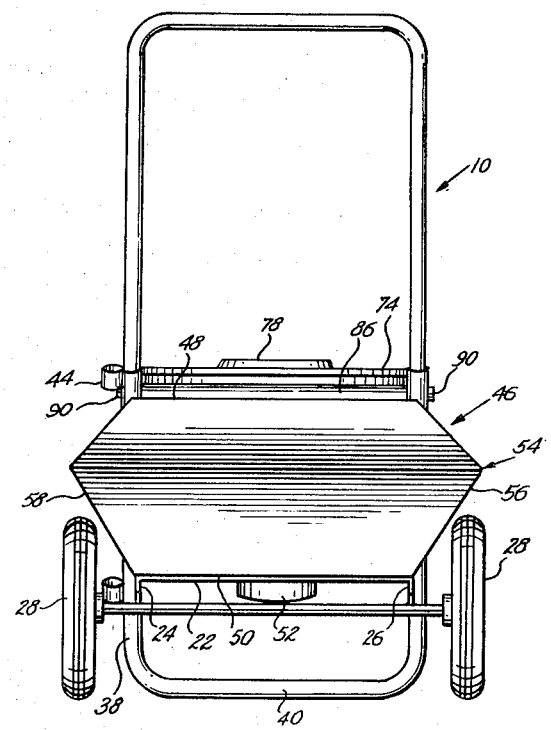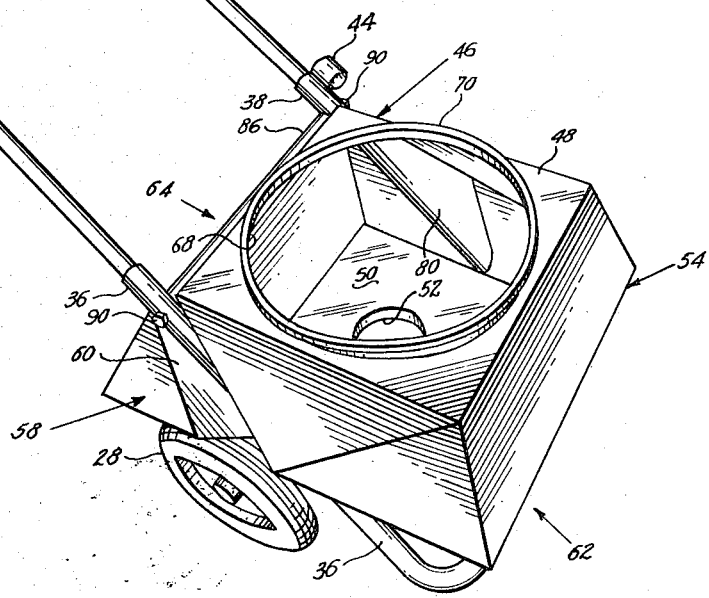

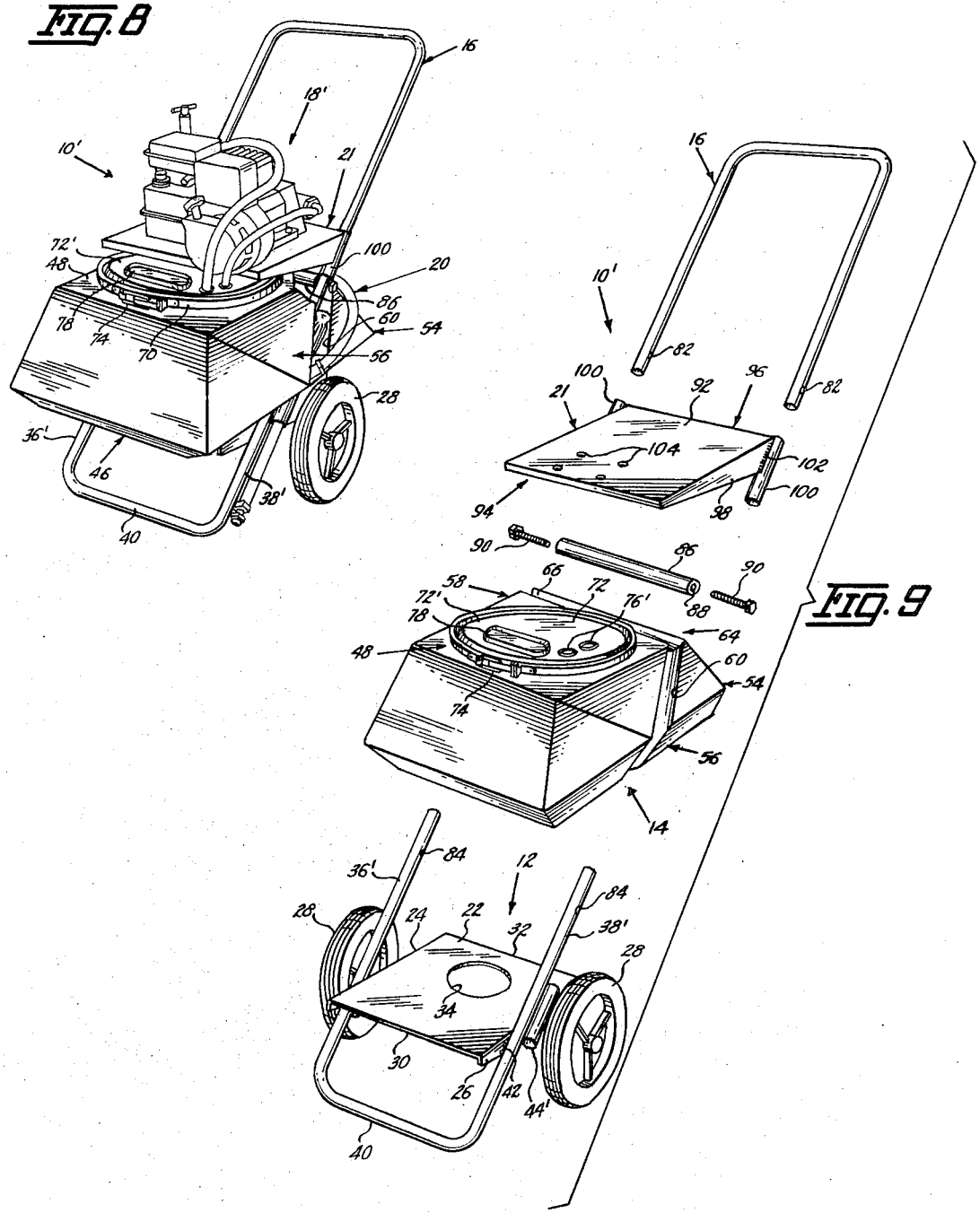

UTILITY SPRAYER UNIT

BACKGROUND OF THE INVENTION

This invention relates to improvements in lawn and garden cart mounted utility sprayers.

Sprayer units of this general type are well known and widely used and being traditionally made of metal, the various chemical products with which they are used result in corrosive action that is deleterious not only to the tanks but to the conventional types of metal fittings and securing means for attaching the same to the cart so that the useful life of such tanks is materially shortened and the task of tank replacement is often difficult.

With the above observations in mind, it one of the important objects of this invention to provide new and improved means for mounting a tank component for a lawn and garden utility sprayer to a support structure and including the provision of a tank that is corrosion resistant.

A further important object herein is to provide a sprayer unit of the above class in which the supporting unit is preferably in the form of a wheeled cart and the means for mounting the tank thereto eliminates the use of screws, bolts or other like fasteners subject to corrosive action.

More particularly, it is an object of this invention to provide an angled slide engagement between external inclined tracks or grooves on the tank and angularly disposed frame components on the tank support or cart whereby the tank can be mounted from only one direction for proper registration with the cart and in a secure manner which restricts the vertical and horizontal movement of the tank away from a proper alignment.

A further object is to provide a sprayer unit as characterized which has a cover adapted to support a power spray mechanism including a gasoline engine associate with an appropriate pump, hoses and spray nozzles and which preferably includes a special engine mount for supporting the power mechanism, if desired, to isolate any vibrations of the power unit from the tank.

The foregoing objects and such further objects as may appear herein, or be hereinafter pointed out, together with the advantages of this invention will be more fully discussed and developed in the more detailed description of the accompanying drawings.

BRIEF DESCRIPTION OF THE DRAWINGS

FIG. 1 is a perspective view of one embodiment of this new and improved utility sprayer unit, FIG. 2 is an exploded perspective view of the sprayer unit shown in FIG. 1, FIG. 3 is a side view thereof, FIG. 4 is a cross sectional view taken on the line 4—4 of FIG. 2, FIG. 5 is a bottom view of the cart with the tank in place, FIG. 6 is a rear view of this sprayer unit, FIG. 7 is a top perspective view of this sprayer unit with the tank lid or cover removed to more clearly illustrate the tank interior, FIG. 8 is a perspective view of a second embodiment of this sprayer unit showing the separate engine mount for carrying the engine and related parts, and FIG. 9 is an exploded perspective view similar to FIG. 2 but showing the new engine mount of FIG. 8.

DESCRIPTION OF THE PREFERRED EMBODIMENTS

Referring to the drawings, one embodiment of this new sprayer unit is designated generally by the numeral 10 as best seen in FIG. 1 and, as seen in the exploded view of FIG. 2, includes generally a support unit in the form of a wheeled cart 12, a tank component 14 and an inverted U-shaped handle unit 16 of which each will be referred to in more detail as this description proceeds. Unit 10 as shown is used with an engine and pump assembly 18 having an attached hose associated handgun 20 (FIG. 1) but no invention is claimed in such components per se. The second embodiment of this sprayer designated 10' is shown in the exploded view of FIG. 9 to illustrate the use of the engine mount 21.

The support unit here shown preferably in the form of cart 12 includes a flat support platform or base 22 which is substantially square although this is not required and is suitably supported at opposed flanged sides 24 and 26 by the tired wheels 28. However, it is pointed out that the wheels 28 are provided for purposes of mobility and if not desired or employed, are not required for purposes of this invention.

For purposes of description, platform 22 defines a front edge 30 and a rear edge 32 and is provided with a hole or opening 34 as shown. Parallel rigid elongated frame members preferably in the form of tubes or pipes 36 and 38 are angularly secured relative to the plane of platform 22 to sides 24 and 26 thereof and for this purpose are secured to sides 24 and 26 near the front edge 30 of platform 22 so as to extend upwardly and rearwardly therefrom. For convenience when support 12 is in the form of a wheeled cart as shown, we have incorporated frames 36 and 38 into an integral U-shaped frame unit by extending frames 36 and 38 downwardly and forwardly from their point of attachment to platform 22 to the integral cross member 40 defining the closed end of such U-shaped frame unit which serves as a ground engaging standard or rest when cart 12 is stationary. preferably, we have made platform 22 and frames 36 and 38 of metal so that such frames are secured to the platform sides 24 and 26 by a weld 42. A pair of spaced keepers 44 are mounted on frame 38 for supporting the handgun 20 when not in use as will be apparent.

The tank component 14 includes a corrosion resistant molded polyethylene tank or container 46 which is a marked departure from the conventionally used metal tanks in articles of this type and has a capacity of 12½ gallons although this, of course, is a matter of choice. In overall appearance, tank 46 is generally square defining a flat top surface 48 and a flat bottom 50 (FIG. 7) with a depending molded sump 52 in bottom 50. As best seen in FIG. 6, the outer perimeter 54 of the body of tank 46 intermediate top 48 and bottom 50 is disposed outwardly from the periphery of top 48 and bottom 50 whereby the tank walls on all sides extend in their upper portions from top 48 outwardly and downwardly to perimeter 54 and in their lower portions, are sloped or angled from perimeter 54 downwardly and inwardly to bottom 50. Opposed external sides of tank 46 represented by the numerals 56 and 58, are provided with relatively deep parallel grooves or tracks 60 angularly disposed so as to extend from a point at bottom 50 substantially midway between the front 62 and rear 64 of tank 46 upwardly and rearwardly to top 48 at the rear 64 where a relatively shallow groove or track 66 (FIG. 2) extends along the rear edge 64 of top 48 to communicate with grooves or tracks 60.

The top 48 is provided with a relatively large opening 68 bordered by the lip or shoulder 70 to which there is mounted a suitable lid or cover 72 secured to shoulder 70 by a lockable ring fastener 74 in a well known manner. Cover 72 is designed to support the engine and pump assembly 18 and for this purpose is provided with appropriate holes 76 for mounting attachments. A small opening and closure 78 is conveniently formed in cover 72 for obvious reasons.

It will be noted that the walls defining the grooves 60 (FIG. 2.) are slightly converged so that the width of the closed end thereof within the interior of tank 46 as seen at 80 in FIG. 7 is slightly smaller than the width at its open end and the distance within tank 46 between the respective closed end portions 80 of grooves 60 corresponds with the distance between frames 36 and 38. In mounting tank 46 to the support or cart 12, such tank, with its front edge 62 oriented in the same direction as the front edge 30 of platform 22, is introduced to frames 36 and 38 from the rear of platform 22 whereby the tops of frames 36 and 38 are first positioned in the grooves 60 adjacent bottom 50 so that tank 46 can be slid angularly forwardly and downwardly on frames 36 and 38 until tank bottom 50 is seated on platform 22. During this movement, sump 52 will come into registration with opening 34 and extend therethrough and for this purpose, it will be noted (FIG. 5) that opening 34 is oversized relative to the diameter of sump 52 to provide for easy entry of the sump as it moves at an angle towards opening 34. A relatively snug friction fit is provided by the closed end portions 80 of grooves 60 on frames 36 and 38 so that tank 46 is firmly positioned on platform 22 and by virtue of the substantial embracement of frames 36 and 38 by grooves or tracks 60, any vertical or horizontal movement of tank 46 relative to platform 22 likely to cause a misalignment for a proper registration is prevented while the tank is being mounted as described.

With tank 46 mounted to the support unit 12 as described, the upper ends of frames 36 and 38 will be at substantially the plane of top 48 to telescopically receive the open ends of the inverted U-shaped handle unit 16, such ends being provided with holes 82 for registration with holes 84 at the upper ends of frames 36 and 38. The registration point for holes 82 and 84 is aligned with groove 66 in which there is seated or nested the stop or lock rod 86 that extends to and between the frames 36 and 38 and the ends of rod 86 are provided with an apertured threaded plug 88 to receive the bolts 90 journalled through holes 82 and 84 to effectively secure handle unit 16 and rod 86 in place as shown. Rod 86 effectively prevents any movement of tank 46 relative to platform 22 and thus such tank is securely mounted without the use of any auxiliary or attached fastening devices subject to corrosive action and can be quickly and easily detached from platform 22 by the removal of rod 86.

The engine assembly 18 is mounted as shown and as previously referred to and may include pump apparatus (not shown) extending into sump 52 to assure complete utilization of any spray liquid used. The handgun 20 is conveniently stored in keepers 44 as shown.

With reference now to FIGS. 8 and 9, we have shown a second embodiment of this sprayer designed as 10' which in all material respects is the same as unit 10 described above except for the addition of the engine mount 21. Accordingly, like parts on unit 10' as related to unit 10 will be given like numerals and corresponding parts having some slight modification because of mount 21 will be identified and described and designated by corresponding numerals primed.

Mount 21 comprises a sturdy flat steel platform 92 defining a front 94 and rear 96 and having gusset shaped sides 98 with their widest end at rear 96 to which elongated tubular inclined sleeves 100 are suitably secured such as by welding 102 so as to extend downwardly and forwardly. Sleeves 100 are slidably mounted over the upper ends of frame members 36' and 38' which differ from members 36 and 38 only in that they are approximately 4½ inches longer to accommodate and support such sleeves 100 whereby the lower ends of the sleeves 100 abut the stop rod 86. In this position, the angle of sleeves 100 relative to platform 92 is such that platform 92 is disposed on a horizontal plane in close spaced relationship above tank cover 72' so that a suitable engine, pump and sprayer mechanism 18' can be bolted thereto through holes 104. Mechanism 18' is similar in purpose to member 18 but illustrates a different style of engine assembly to indicate that different engine and pump styles may be suitably employed as desired. The mounting of tank 14 to cart 12 and the handle 16 to frame members 36' and 38' on sprayer 10' is the same as previously described for unit 10. Cover 72' does not require the holes 76 (FIG. 2) used for mounting the engine 18 but is provided with appropriate holes 76' for such hose components as may be on engine assembly 18' and on unit 10', the individual keepers 44 shown on frame member 38 of unit 10 are replaced by a single elongated keeper 44' on frame member 38' centrally of its length.

The operation of engine assemblies 18 or 18' will develop certain inherent vibrations as is well known and thus in those cases where tank 14 may be made of plastic materials, it is recommended that unit 10' with the separate engine mount 21 be used for the reason that such mount 21 is supported directly by frame members 36' and 38' so that any vibrations from engine 18' are transmitted to mount 21 and members 36' and 38' whereby tank 14 is isolated therefrom and not subject to any possible damaging effects that could emanate therefrom. However, it is not intended that the means described for mounting the tank 14 to the cart 12 be limited to plastic tanks since such embodiment as designated 10 may be employed to advantage with tanks of other materials including metal. Accordingly, in view of all of the foregoing, it is thought a full understanding of the construction and operation of this invention will be had and the advantages thereof appreciated.

We claim:
1. A utility sprayer unit, comprising:
a support base having opposed sides and a front and rear,
opposed spaced and parallel upstanding frame members secured respectively to said opposed sides,
a tank having opposed sides each provided with a groove on the exterior surface thereof with said grooves being in parallel relationship to each other, the distance between the recessed end portions of said grooves corresponding substantially with the distance between said frame members, said tank being disposed on said base intermediate said frame members with said respective frame members nested in a respective groove to frictionally engage said tank and hold it securely on said base, and said tank being adapted for cooperative association with a power operated pump and spraying mechanism.

2. A sprayer unit as defined in claim 1 wherein:

said tank includes a top and the upstanding ends of said frame members being substantially planar therewith when said tank is disposed on said base, and a stop member releasably secured to and between said upstanding ends and in engagement with said tank to prevent any movement of said tank relative to said frame members.

3. A sprayer unit as defined in claim 1 wherein:

said tank includes a top and a back connected thereto, the upstanding ends of said frame members being substantially planar with the juncture of said top and back, and a stop member secured to and between the upstanding ends of said frame members and in engagement with said tank to prevent any tank movement relative to said frame members and said base when said tank is positioned on said base.

4. A sprayer unit as defined in claim 3 including:

said tank being provided with a separate groove at the juncture of said top and back with said separate groove extending to and between said opposed sides, and said stop member being nested in said separate groove and releasably secured to said frame members.

5. A sprayer unit as defined in claim 1 including the walls defining said grooves being converged from the external surface of said tank towards their innermost depth to facilitate frictional engagement with said frame members.

6. A sprayer unit as defined in claim 1 including:

a ground engaging wheel assembly carried by said base, and a handle unit operatively secured to the upstanding ends of said frame members.

7. A sprayer unit as defined in claim 1 wherein:

said tank includes a flat top surface provided with a relatively large opening, a rigid cover removably arranged relative to said opening, and said cover adapted to support any selected engine powered spray assembly.

8. A sprayer unit as defined in claim 1 including:

a platform designed to support any selected engine powered spraying assembly, means mounting said platform to said frame members so that said platform is disposed horizontally in close spaced relationship above said tank, means on said tank affording operably connection with any selected engine powered spray assembly on said platform with the contents of said tank, and said platform serving to isolate said tank from any vibrations emanating from the operation of an engine powered spray assembly mounted on said platform.

9. A sprayer unit as defined in claim 1 wherein:

said tank includes a top and a back connected thereto, the upstanding ends of said frame members being substantially planar with the juncture of said top and back, a stop member secured to and between the upstanding ends of said frame members and in engagement with said tank to prevent any tank movement relative to said frame members and said base when said tank is positioned on said base, a platform for supporting any selected engine powered spray assembly, means for removably mounting said platform to said frame members and engageable with said stop member whereby said platform is disposed horizontally in close spaced relationship above said tank, said stop member serving to limit the movement of said platform relative to said frame members towards said tank, and said platform serving to isolate said tank from any vibrations emanating from the operation of an engine powered spray assembly mounted on said platform.

10. A sprayer unit as defined in claim 1 including:

said frame members being secured to said opposed sides of said base at respective points near the front thereof and extending angularly therefrom upwardly and rearwardly, said grooves on said tank being angularly inclined correspondingly to the angle of inclination of said frame members, the nesting of said frame members in said grooves effected by the introduction of said grooves into an angled slidable engagement with said frame members only from a position at the rear of said base, and said grooves being relatively deep to substantially embrace said frame members whereby the cooperative engagement between said frame members and said grooves in mounting said tank to said base prevents any vertical or horizontal misalignment of said tank relative to its proper positioning on said base.

11. A sprayer unit as defined in claim 10 including:

a platform for supporting any selected engine powered spray assembly, means for slidably mounting said platform to said frame members, a stop member mounted to said frame members and engageable by said platform whereby said platform is disposed horizontally in close spaced relationship above said tank, said stop member serving to limit the movement of said platform relative to said frame members towards said tank, and when said platform has an engine powered spray assembly mounted thereto, the weight thereof serves to restrict the movement of said platform relative to said frame members away from said tank.

12. A sprayer unit as defined in claim 10 including:

said base being provided with an opening, said tank including a bottom provided with a depending sump extended through said opening when said tank is disposed on said base, and said opening being oversized relative to said sump to provide for adequate entry clearance of said sump into said opening during its angled direction of movement as said tank is slid relative to said frame members.

* * * * *